United States Patent [19]

Deconinck

[11] 4,243,280
[45] Jan. 6, 1981

[54] FURNITURE ASSEMBLY WITH SYNTHETIC RESIN MEMBERS

[75] Inventor: Didier Deconinck, Seyssins, France

[73] Assignee: Allibert Exploitation, Société Anonyme, Grenoble, France

[21] Appl. No.: 27,389

[22] Filed: Apr. 5, 1979

[51] Int. Cl.³ .......................... A47B 81/00; A47F 3/00
[52] U.S. Cl. .................................... 312/140; 312/214; 312/263
[58] Field of Search ........................ 312/140, 214, 263; 428/511, 518, 528, 541; 108/150

[56] References Cited

U.S. PATENT DOCUMENTS

| 2,569,934 | 10/1951 | Kurtzon | 312/140 X |
| 3,219,401 | 11/1965 | Mapson | 312/140 X |
| 3,353,888 | 11/1967 | Pritelli | 312/140 X |
| 3,365,257 | 1/1968 | Diack | 312/140 |
| 3,494,308 | 2/1970 | Perrin | 108/150 |
| 3,494,686 | 2/1970 | Diack | 312/140 |
| 3,664,275 | 5/1972 | Kleinert | 108/150 |
| 3,880,092 | 4/1975 | Seeber | 108/901 X |

Primary Examiner—James T. McCall
Attorney, Agent, or Firm—Karl F. Ross

[57] ABSTRACT

A cupboard, chest or like article of furniture having a top, front wall, side walls and rear wall, has its top wall formed from a panel of wood composition completely encased in a sheath of synthetic resin which also forms a frame around the periphery of the top and is integrally molded with formations adapted to connect the top to the walls of the article. These formations can include tongues or blades adapted to fit snugly into hollows of the walls and/or spaced-apart lips or flanges adapted to receive a wall between them.

5 Claims, 4 Drawing Figures

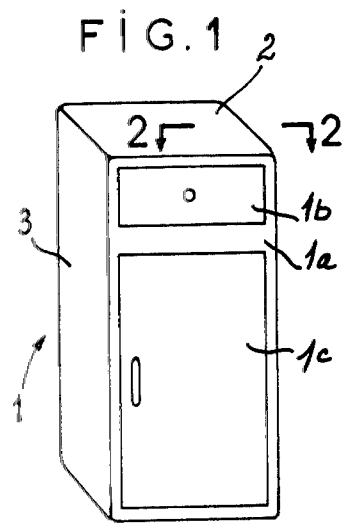
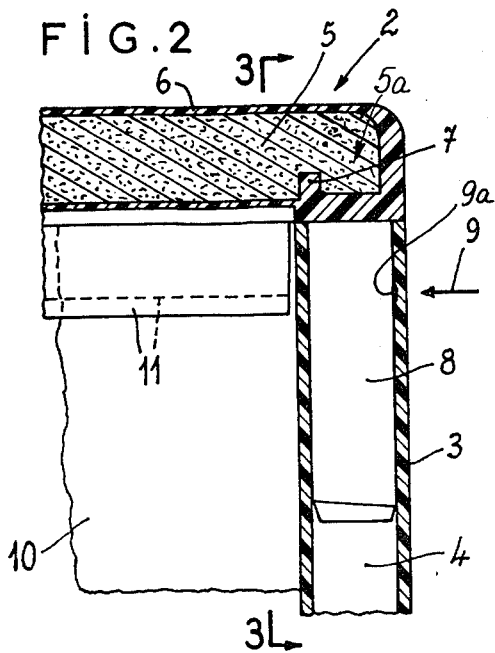
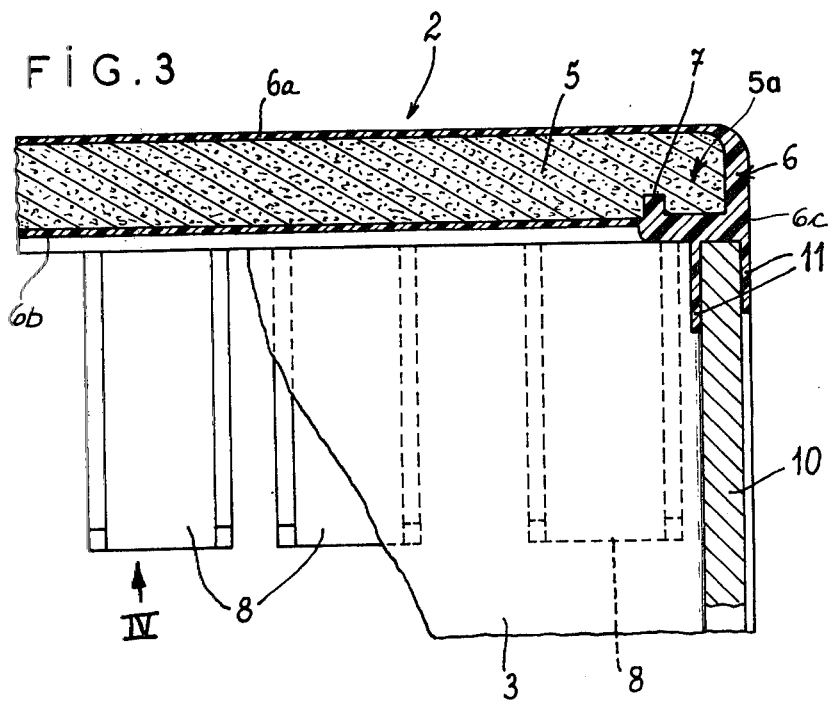
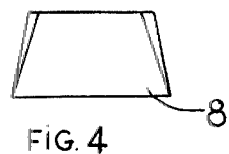

FURNITURE ASSEMBLY WITH SYNTHETIC RESIN MEMBERS

FIELD OF THE INVENTION

My present invention relates to furniture assemblies constituted at least in part of synthetic-resin walls or members and, more particularly, to improved articles of furniture of the cabinet, cupboard or shelf type in which a generally flat top is supported upon at least two walls, the walls including, for example, lateral walls, a front wall and a rear wall, so that the top holds the walls in appropriately spaced relationship and forms with the walls of a relatively stable and rigid structure.

The invention also relates to an improved top structure for articles of furniture.

BACKGROUND OF THE INVENTION

It has become, of late, a common practice to make articles of furniture, such as bureaus, dressers, chests, commodes, desks, cupboards, shelf units and the like at least in part from synthetic-resin members which are molded independently of one another and then are assembled. One of the problems with such systems is that the wall elements, including the top wall, are generally relatively thin to save costs because of the expense of the resin. However, while relatively thin members may be effective to provide the desired aesthetic appearance, they frequently do not have a satisfactory mechanical structure. For example, if one applies pressure to such element they tend to bend or deflect and if one taps them they have hollow or weak sounds.

Attempts have been made to improve upon such structures by the use of hollow walls of greater mechanical strength, by the introduction of reinforcements into the walls and the like without being wholly satisfactory.

For example, while a thin light construction may be suitable for the lateral walls of the assembly, it is wholly unsatisfactory for the top since weighty objects may be placed thereon. As a consequence, it has been difficult heretofore to gain as fully as possible the advantages of the molding art with synthetic-resin material while keeping the cost of an article of furniture sufficiently low as to make the assembly desirable, yet affording the appearance, sounds and feel of the robust, massive and stable articles much preferred by potential users.

OBJECTS OF THE INVENTION

It is, therefore, the principal object of the present invention to provide an improved furniture assembly or article of furniture, especially a cupboard, chests or like structures, which is free from the disadvantages of earlier systems, can be readily and inexpensively assembled, and which provides, at least at its top, a robust and strong feel and characteristic.

Another objects of this invention is to provide an improved article of furniture of the class described which is structurally more stable than has been the characteristic of earlier synthetic-resin furniture articles.

Yet another object of this invention is to provide an improved top member for such an article of furniture.

SUMMARY OF THE INVENTION

These objects and others which will become apparent hereinafter are attained, in accordance with the invention, in an article of furniture of the class described in which the top member or wall is composed of a generally flat panel of agglomerated (composition) material of a wood base which is sheathed and fully coated with a synthetic resin which can be injection molded completely around this rectangular panel and provided in the molding process with formations adapted to interconnect the top of the lateral, front and/or rear walls of the furniture article.

The term "agglomerated material" or "composition" is used herein to refer to wood-base composites of the type frequently referred to as particle board, chip board or fiber board in which the fibers, chips or particles are bonded together with a synthetic-resin binder of the thermosetting type. Typical of such binders are phenolformaldehyde resins.

According to the invention, the molded synthetic-resin sheath which surrounds the top wood-composition panel and is molded in situ therearound, comprises relatively thin upper and lower cover layers of the synthetic resin unitary with one another and with a thicker edge portion which runs around the entire periphery of the wood-composition panel. According to an improved feature of the invention, this thickened portion which can be considered a frame, is formed unitarily with a pair of flanges or lips along the rear edge of the top to define a groove or slot which receives the upper edge of the rear wall of the furniture article. The rear wall has a sliding fit into the slot formed between these lips or flanges and can be subsequently fixed to them by ultrasonic welding by adhesive bonding, or by any conventional fastening technique.

In addition, the lateral edges of the frame can be formed unitarily with vertical tongues or blades cooperating with the lateral walls of the hollow configuration mentioned previously and generally molded from synthetic resin. These tongues enter the hollow spaces of these lateral walls and fit snugly therein. The hollow walls can also be fastened to the tongues by any conventional technique, although I prefer to use ultrasonic welding to effect a bond between them.

Naturally, the cover can be provided with similar formations to engage the front wall or the front wall can be simply affixed to the lateral walls. The walls can, of course, be provided with fittings or formations themselves, e.g. the lateral walls can support drawers, the front wall can hang doors, etc.

The article of furniture of the present invention thus has the following significant advantages:

Firstly, it is in fact robust because of the nature of its upper surface and member and the effectiveness of its connection with the lateral walls of the article.

Secondly, the flat, planar surface of the upper member has a response to touch similar to that of a massive wood body while tapping of the surface also gives the impression that a massive body is involved.

Thirdly, a relatively small quantity of synthetic resin is required for the upper member so that this upper member can be fabricated at relatively low cost and hence the cost of the entire article can be kept to a minimum.

Finally, the resin sheath forming the visible portion of the upper member or top allows all sorts of decors to be applied by conventional techniques while rounding of the panel and of the conforming molded synthetic-resin sheath along the upper edges and its coverage by the synthetic-resin material, decreases the risk of injury to an individual who may collide with the edge of the article.

BRIEF DESCRIPTION OF THE DRAWING

The above and other objects, features and advantages of the present invention will become more readily apparent from the following description, reference being made to the accompanying drawing in which:

FIG. 1 is a perspective view diagrammatically illustrating a small cupboard formed in accordance with the principles of the present invention;

FIG. 2 is a cross-sectional view taken along the line 2—2 of FIG. 1 illustrating the top member of the article of furniture;

FIG. 3 is a section along the line 3—3 of FIG. 2; and

FIG. 4 is an end view of a tongue in the direction of arrow IV.

SPECIFIC DESCRIPTION

The drawing illustrates an article of furniture which can be made in accordance with the principles of the present invention and shows in detail the top member 20 which is the primary subject thereof, as well as the connection between this member and the rear and side walls of the article.

In FIG. 1 the cupboard 1 is shown to have a rounded-edge top 2 which is planar and horizontal and a pair of lateral walls of which one can be seen at 3. The other lateral wall, disposed mirror symmetrically with member 3, is on the invisible side of the cupboard which also has a rear wall not shown and a front wall 1a provided with a drawer 1b and a door 1c. The wall 1a may be attached in the same manner as the lateral wall 3 to be described, the lateral wall 3 may be formed with guides to carry the drawer, and the front wall 1a can have hinges upon which the door 1c is swingable, these elements being conventional in the art and therefore not illustrated.

As is apparent from FIG. 2, each of the lateral walls 3 is molded from synthetic-resin material and is constituted as a so-called double-wall structure with a hollow space 4. The rear wall 10 (FIG. 3) can also be molded from synthetic resin or provided as pressed board or a like composition.

The top 2 comprises a reactangular panel or board 5 of wood-base composition (agglomerated material) which is coated over all of its surfaces by a conforming layer of synthetic-resin material 6 molded in situ around this panel and therefore providing upper and lower coatings 6a and 6b as well as frame 6c which is thicker than the top and bottom layers. The synthetic resin thus forms a continuous and unitary sheath all around the panel 5.

In order to obtain an effective bond between the panel 5 and the synthetic-resin sheath 6 it has been found to be advantageous to provide at least the lower face 5 with one or more grooves 5a, e.g. a downwardly open groove extending all around the lower face just inwardly of the outer edge, in which the ribs 7 of the synthetic-resin material of the sheath can be integrally and unitarily molded.

Essential to the invention is the fact that the synthetic resin 6 which completely covers the panel 5, is formed unitarily and integrally during its molding process, with all of the elements necessary to connect the cover or top to the other walls of the article.

As shown in FIGS. 2–4, tongues, blades or fingers 8 molded onto the frame 6c along each of the opposite lateral edges of the top, are elongated and directed toward the bottom is spaced apart parallel relationship.

The tongues or fingers 8 are profiled and dimensioned to fit snugly (without play) in the hollows 4 delimited by the inner and outer members of each lateral wall 3.

To firmly connect each lateral wall with these fingers or tongues 8, various means can be provided, e.g. solvent welding, adhesive or thermal fusion, although best results have been obtained by ultrasonic welding with the ultrasonic energy being applied as represented by the arrow 9 in FIG. 2 to produce at least a specific spot bond at the region 9a between each tongue and the outer member of the top-wall structure 3.

The frame portion 6c of the top is also provided unitarily during the molding operation with means for connecting the rear wall 10 to the top. This means may be constituted by two lips turned downwardly along the rear longitudinal edge of the top member. The two lips 11 define between them a groove along the interior of which the rear panel 10 can be slid into place.

Naturally, the invention is not limited to the single embodiment disclosed and will be understood to include, within the spirit and scope of the appealed claims, variants such as changes in the shape, size and function of the article of furniture or in the means for connecting and assembling the article.

I claim:

1. An article of furniture comprising at least two upright walls and a top spanning said walls and connected thereto, said top comprising a planar composition panel sheath with a synthetic resin injection molded in situ around said panel and forming a frame along the edges thereof, said frame being provided unitarily with at least one group of downwardly extending tongues molded unitarily with said frame and fitting into one of said walls, another edge of the top being formed with a pair of downwardly extending flanges formed unitarily with the synthetic resin and defining a groove receiving another of said walls.

2. The article defined in claim 1 wherein said panel is composed of wood-base composition and is generally rectangular.

3. The article of furniture defined in claim 2 wherein said frame is formed along two opposite edges of the panel with respective groups of said tongues for engagement with opposite lateral walls of the article, said flanges and grooves being provided on a rear wall of said top.

4. The article of furniture defined in claim 3 wherein the underside of said panel is provided with a downwardly open groove inwardly from its edge and into which said synthetic resin is molded to form a rib.

5. The article of furniture defined in claim 4 wherein each of said lateral walls is affixed at an ultrasonic weld to the respective tongues.

* * * * *